(12) United States Patent
Al-Imari et al.

(10) Patent No.: US 11,252,710 B2
(45) Date of Patent: Feb. 15, 2022

(54) FREQUENCY DOMAIN RESOURCE ALLOCATION FOR COMPACT DOWNLINK CONTROL INFORMATION IN MOBILE COMMUNICATIONS

(71) Applicant: MediaTek Singapore Pte. Ltd., Singapore (SG)

(72) Inventors: Mohammed S Aleabe Al-Imari, Cambridge (GB); Raghavendra Ramakrishna, Cambridge (GB)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/382,151

(22) Filed: Apr. 11, 2019

(65) Prior Publication Data

US 2019/0320421 A1    Oct. 17, 2019

Related U.S. Application Data (60) Provisional application No. 62/656,550, filed on Apr. 12, 2018, provisional application No. 62/670,084, filed on May 11, 2018.

(51) Int. Cl.
*H04W 72/04* (2009.01)
(52) U.S. Cl.
CPC ................................. *H04W 72/042* (2013.01)
(58) Field of Classification Search
CPC ...... H04L 5/00; H04L 5/0035; H04W 72/042; H04W 72/04; H04W 72/0453
See application file for complete search history.

(56) References Cited

U.S. PATENT DOCUMENTS

| | | | | |
|---|---|---|---|---|
| 2010/0128614 | A1* | 5/2010 | Kuusela | H04L 47/822 370/252 |
| 2018/0049203 | A1* | 2/2018 | Xue | H04W 72/0453 |
| 2019/0045489 | A1* | 2/2019 | He | H04W 72/12 |
| 2019/0140807 | A1* | 5/2019 | Wang | H04W 72/042 |
| 2019/0230689 | A1* | 7/2019 | Cao | H04L 1/0068 |

(Continued)

FOREIGN PATENT DOCUMENTS

CN    105991243 A    10/2016

OTHER PUBLICATIONS

China National Intellectual Property Administration, International Search Report and Written Opinion for International Patent Application No. PCT/CN2019/082538, dated Jul. 11, 2019.

(Continued)

*Primary Examiner* — Benjamin H Elliott, IV
(74) *Attorney, Agent, or Firm* — Han IP PLLC; Andy M. Han (57) ABSTRACT

Various solutions for frequency domain-resource allocation (FD-RA) for compact downlink control information (DCI) design and operations with respect to user equipment and network apparatus in mobile communications are described. An apparatus may determine at least one of a first step size corresponding to a start of a FD-RA, a second step size corresponding to a length of the FD-RA, and a number of FD-RA bits. The apparatus may determine resources blocks (RBs) according to at least one of the first step size, the second step size, and the number of FD-RA bits. The apparatus may perform a downlink or uplink transmission according to the RBs.

14 Claims, 9 Drawing Sheets

700

| NUMBER OF RBs | $M_1$ | $M_2$ |
|---|---|---|
| < 32 | 1 | 1 |
| 32 - 44 | 1 | 2 |
| 45 - 62 | 2 | 2 |
| 63 - 76 | 2 | 3 |
| 77 - 93 | 3 | 3 |
| 94 - 107 | 3 | 4 |
| 108 - 124 | 4 | 4 |
| 125 - 139 | 4 | 5 |
| 140 - 155 | 5 | 5 |
| 156 - 170 | 5 | 6 |
| 171 - 186 | 6 | 6 |
| 187 - 201 | 6 | 7 |
| 202 - 217 | 7 | 7 |
| 218 - 232 | 7 | 8 |
| 233 - 248 | 8 | 8 |
| 249 - 263 | 8 | 9 |
| 264 - 275 | 9 | 9 |

(56) References Cited

U.S. PATENT DOCUMENTS

2019/0306861 A1* 10/2019 Li .................... H04W 72/0453
2019/0313412 A1* 10/2019 Baldemair ............ H04L 5/0053
2019/0320421 A1* 10/2019 Al-Imari ............. H04W 72/042
2020/0120680 A1*  4/2020 Hwang ................ H04L 5/0044

OTHER PUBLICATIONS

Ericsson, Summary of 7.1.3.1.4 (DCI contents and formats), 3GPP TSG-RAN WG1 #92, R1-1803232, Athens, Greece, Feb. 26-Mar. 2, 2018.
Mediatek Inc., Remaining issues of DL/UL data scheduling and HARQ procedure, 3GPP TSG RAN WG1 Meeting #94, R1-1808261, Gothenburg, Sweden, Aug. 20-24, 2018.

* cited by examiner

| Step size (M) | Number of resource blocks (N) | |
|---|---|---|
| | N_MIN | N_MAX |
| 1 | 1 | 44 |
| 2 | 45 | 88 |
| 3 | 89 | 132 |
| 4 | 133 | 176 |
| 5 | 177 | 220 |
| 6 | 221 | 264 |
| 7 | 265 | 275 |

FIG. 1

| FD-RA BITS | 10 | 9 | 8 | 7 | 6 | 5 | 4 |
|---|---|---|---|---|---|---|---|
| BETA | 44 | 31 | 22 | 15 | 10 | 7 | 5 |

| FD-RA BITS | NUMBER OF RESOURCE BLOCKS (N) | |
| --- | --- | --- |
| | N_MIN | N_MAX |
| 2 | 6 | 10 |
| 3 | 11 | 15 |
| 4 | 16 | 25 |
| 5 | 26 | 35 |
| 6 | 36 | 50 |
| 7 | 51 | 75 |
| 8 | 76 | 110 |
| 9 | 111 | 155 |
| 10 | 156 | 220 |
| 11 | 221 | 275 |

FIG. 4

| FD-RA BITS | $M_1$ | 1 | 2 | 3 | 4 | 5 | 6 | 7 | 8 | 9 |
|---|---|---|---|---|---|---|---|---|---|---|
| 1 | | 12 | 11 | 10 | 10 | 9 | 9 | 9 | 9 | 9 |
| 2 | | 11 | 10 | 9 | 9 | 8 | 8 | 8 | 8 | 8 |
| 3 | | 10 | 9 | 8 | 8 | 8 | 8 | 7 | 7 | 7 |
| 4 | | 10 | 9 | 8 | 8 | 7 | 7 | 7 | 7 | 7 |
| 5 | | 9 | 8 | 8 | 7 | 7 | 7 | 7 | 7 | 6 |
| 6 | | 9 | 8 | 8 | 7 | 7 | 7 | 6 | 6 | 6 |
| 7 | | 9 | 8 | 7 | 7 | 7 | 6 | 6 | 6 | 6 |
| 8 | | 9 | 8 | 7 | 7 | 7 | 6 | 6 | 6 | 6 |
| 9 | | 9 | 8 | 7 | 7 | 6 | 6 | 6 | 6 | 6 |

| FD-RA BITS | M₁ | 1 | 2 | 3 | 4 | 5 | 6 | 7 | 8 | 9 |
|---|---|---|---|---|---|---|---|---|---|---|
| 1 | | 13 | 12 | 12 | 11 | 11 | 11 | 11 | 11 | 10 |
| 2 | | 12 | 11 | 11 | 10 | 10 | 10 | 10 | 10 | 9 |
| 3 | | 12 | 11 | 10 | 10 | 10 | 9 | 9 | 9 | 9 |
| 4 | | 11 | 10 | 10 | 10 | 9 | 9 | 9 | 9 | 8 |
| 5 | | 11 | 10 | 10 | 9 | 9 | 9 | 8 | 8 | 8 |
| 6 | | 11 | 10 | 9 | 9 | 9 | 8 | 8 | 8 | 8 |
| 7 | | 11 | 10 | 9 | 9 | 8 | 8 | 8 | 8 | 8 |
| 8 | | 11 | 10 | 9 | 9 | 8 | 8 | 8 | 8 | 7 |
| 9 | | 10 | 9 | 9 | 8 | 8 | 8 | 8 | 7 | 7 |

FIG. 6

| Number of RBs | $M_1$ | $M_2$ |
|---|---|---|
| < 32 | 1 | 1 |
| 32 - 44 | 1 | 2 |
| 45 - 62 | 2 | 2 |
| 63 - 76 | 2 | 3 |
| 77 - 93 | 3 | 3 |
| 94 - 107 | 3 | 4 |
| 108 - 124 | 4 | 4 |
| 125 - 139 | 4 | 5 |
| 140 - 155 | 5 | 5 |
| 156 - 170 | 5 | 6 |
| 171 - 186 | 6 | 6 |
| 187 - 201 | 6 | 7 |
| 202 - 217 | 7 | 7 |
| 218 - 232 | 7 | 8 |
| 233 - 248 | 8 | 8 |
| 249 - 263 | 8 | 9 |
| 264 - 275 | 9 | 9 |

FREQUENCY DOMAIN RESOURCE ALLOCATION FOR COMPACT DOWNLINK CONTROL INFORMATION IN MOBILE COMMUNICATIONS

CROSS REFERENCE TO RELATED PATENT APPLICATION(S)

The present disclosure claims the priority benefit of U.S. Provisional Patent Application No. 62/656,550, filed 12 Apr. 2018, and U.S. Provisional Patent Application No. 62/670,084, filed 11 May 2018. The contents of aforementioned applications are herein incorporated by reference in their entirety.

TECHNICAL FIELD

The present disclosure is generally related to mobile communications and, more particularly, to frequency domain-resource allocation (FD-RA) for compact downlink control information (DCI) design and operations with respect to user equipment and network apparatus in mobile communications.

BACKGROUND

Unless otherwise indicated herein, approaches described in this section are not prior art to the claims listed below and are not admitted as prior art by inclusion in this section.

In New Radio (NR), ultra-reliable and low latency communications (URLLC) is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER.

Some of the fields of the normal DCI are not applicable or does not make sense for the high latency sensitive transmissions. Reliability of the DCI depends on the size. The smaller the size of DCI is, the better the reliability may be given that the transmission resources are same due to the lower coding gain. Using normal DCI for the same reliability may need to increase the aggregation level, which has the drawback of blocking probability. Besides, smaller bandwidth parts may not be able to accommodate higher aggregation levels. Accordingly, compact DCI design is needed by the fact that the normal DCI size is large and inefficient for the URLLC control transmissions.

It can be expected to have a diverse range of URLLC services in the future, each targeting a different use case. Accordingly, how to fulfil strict reliability requirements may become a new issue in the newly developed communication system. It is needed to provide proper compact DCI design and operations to reduce DCI size and improve reliability for control signal transmissions.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to propose solutions or schemes that address the aforementioned issues pertaining to FD-RA for compact DCI design and operations with respect to user equipment and network apparatus in mobile communications.

In one aspect, a method may involve an apparatus determining at least one of a first step size corresponding to a start of a FD-RA, a second step size corresponding to a length of the FD-RA, and a number of FD-RA bits. The method may also involve the apparatus determining resources blocks (RBs) according to at least one of the first step size, the second step size, and the number of FD-RA bits. The method may further involve the apparatus performing a downlink or uplink transmission according to the RBs.

In one aspect, an apparatus may comprise a transceiver capable of wirelessly communicating with a network node of a wireless network. The apparatus may also comprise a processor communicatively coupled to the transceiver. The processor may be capable of determining at least one of a first step size corresponding to a start of a FD-RA, a second step size corresponding to a length of the FD-RA, and a number of FD-RA bits. The processor may also be capable of determining RBs according to at least one of the first step size, the second step size, and the number of FD-RA bits. The processor may further be capable of performing a downlink or uplink transmission according to the RBs.

It is noteworthy that, although description provided herein may be in the context of certain radio access technologies, networks and network topologies such as Long-Term Evolution (LTE), LTE-Advanced, LTE-Advanced Pro, 5th Generation (5G), New Radio (NR), Internet-of-Things (IoT) and Narrow Band Internet of Things (NB-IoT), the proposed concepts, schemes and any variation(s)/derivative(s) thereof may be implemented in, for and by other types of radio access technologies, networks and network topologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to FD-RA for compact DCI with respect to user equipment and network apparatus in mobile communications. According to the present disclosure, a number of possible solutions may be implemented separately or jointly. That is, although these possible solutions may be described below separately, two or more of these possible solutions may be implemented in one combination or another.

In NR, URLLC is supported for emerging applications that demands high requirements on end-to-end latency and reliability. A general URLLC reliability requirement is that a packet of size 32 bytes shall be transmitted within 1 millisecond end-to-end latency with a success probability of $10^{-5}$. URLLC traffic is typically sporadic and short whereas low-latency and high-reliability requirements are stringent. For example, the control reliability of URLLC has to be stricter than the data reliability which is up to $10^{-6}$ BLER.

Some of the fields of the normal DCI are not applicable or does not make sense for the high latency sensitive transmissions. Reliability of the DCI depends on the size. The smaller the size of DCI is, the better the reliability may be given that the transmission resources are same due to the lower coding gain. Using normal DCI for the same reliability may need to increase the aggregation level, which has the drawback of blocking probability. Besides, smaller bandwidth parts may not be able to accommodate higher aggregation levels. Accordingly, compact DCI design is needed by the fact that the normal DCI size is large and inefficient for the URLLC control transmissions.

The UE shall determine the resource block assignment in frequency domain using the resource allocation field in the detected physical downlink control channel (PDCCH) DCI. In NR, two resource allocation schemes, type 0 and type 1, are supported. In resource allocation of type 1, the resource block assignment information may be indicated to a scheduled UE a set of contiguously allocated localized or distributed virtual resource blocks within the active carrier bandwidth part of size $N_{BWP}^{size}$ physical resource blocks (PRBs). The type 1 resource allocation field may consist of a resource indication value (RIV) corresponding to a starting virtual resource block (e.g., $RB_{start}$) and a length in terms of contiguously allocated resource blocks (e.g., $L_{RBs}$) The RIV may be defined by the following expressions.

---

If $(L_{RBs} - 1) \leq \lfloor N_{BWP}^{size}/2 \rfloor$ then
$\quad RIV = N_{BWP}^{size} (L_{RBs} - 1) + RB_{start}$
else
$\quad RIV = N_{BWP}^{size} (N_{BWP}^{size} - L_{RBs} + 1) + (N_{BWP}^{size} - 1 - RB_{start})$
where $L_{RBs} \geq 1$ and shall not exceed $N_{BWP}^{size} - RB_{start}$.

---

In view of the above, the present disclosure proposes a number of schemes pertaining to FD-RA for compact DCI with respect to the UE and the network apparatus. According to the schemes of the present disclosure, compact DCI format for URLLC may be defined and used for URLLC services. The bit-fields of compact DCI may be carefully designed to reduce the size of the DCI. Specifically, the number of FD-RA bits in the DCI may be reduced by reducing the granularity for the start of the FD-RA and the length of the FD-RA. Compact DCI design for URLLC may improve the reliability of control channel. Such design may also reduce the need for higher aggregation level to meet the reliability thereby reducing the blocking probability.

The compact DCI may comprise the resource allocation field. The UE may be configured to determine the resource block assignment in frequency domain according to the resource allocation field. The resource allocation field may comprise a plurality of FD-RA bits. The FD-RA bits may indicate resource block assignment information including at least one of the start of the allocated RBs, the length of the allocated RBs, and the number of the FD-RA bits. The start of the allocated RBs may correspond to a first step size (e.g., $M_1$). The length of the allocated RBs may correspond to a second step size (e.g., $M_2$).

An apparatus may be configured to determine the resource allocation according to the schemes of the present disclosure. The apparatus may comprise a UE or a network node of a wireless network. The apparatus may be configured to determine at least one of the first step size corresponding to the start of the allocated RBs, the second step size corresponding to the length of the allocated RBs, and the number of FD-RA bits. The apparatus may be configured to determine the allocated RBs according to at least one of the first step size, the second step size, and the number of FD-RA bits. The apparatus may be configured to perform a downlink or uplink transmission according to the allocated RBs.

Specifically, the apparatus may be configured to determine at least one of the first step size and the second step size according to a fixed number of FD-RA bits. In other words, for a given number of the FD-RA bits (e.g., the size of the FD-RA field in the DCI), at least one of the first step size and the second step size may be determined/chosen based on the number of available RBs. In addition to fixing the number of FD-RA bits, one of the step sizes (e.g., $M_1$ or $M_2$) may be fixed as well. The fixed number of FD-RA bits may be applicable to all the configurations such as subcarrier spacing (SCS), bandwidth part size, etc. For example, in an event that the first step size is equal to the second step size (e.g., $M_1=M_2=M$), the step size (e.g., M) may be determined according to the following equation.

$$FDRA_{bits} = \left\lceil \log_2\left(\frac{1}{2}\left\lceil\frac{N}{M}\right\rceil\left(\frac{N}{M}+1\right)\right)\right\rceil$$

N may denote the number available of RBs which may be, for example and without limitation, based on the bandwidth part (BWP) or the total/system bandwidth.

In an event that the first step size is not equal to the second step size (e.g., $M_1 \neq M_2$), the first step size and the second step size may be determined according to the following equation.

$$FDRA_{bits} = \left\lceil \log_2\left(\sum_{n=0}^{\lfloor N/M_1 \rfloor}\left\lceil\frac{N-nM_1}{M_2}\right\rceil\right)\right\rceil$$

It should be noted that such equation may lead to multiple solutions for $M_1$ and $M_2$. Further constraints may be applied to $M_1$ and $M_2$ to achieve unique $M_1$ and $M_2$ (e.g., $M_1 = M_2 + 2$).

Figure 1:
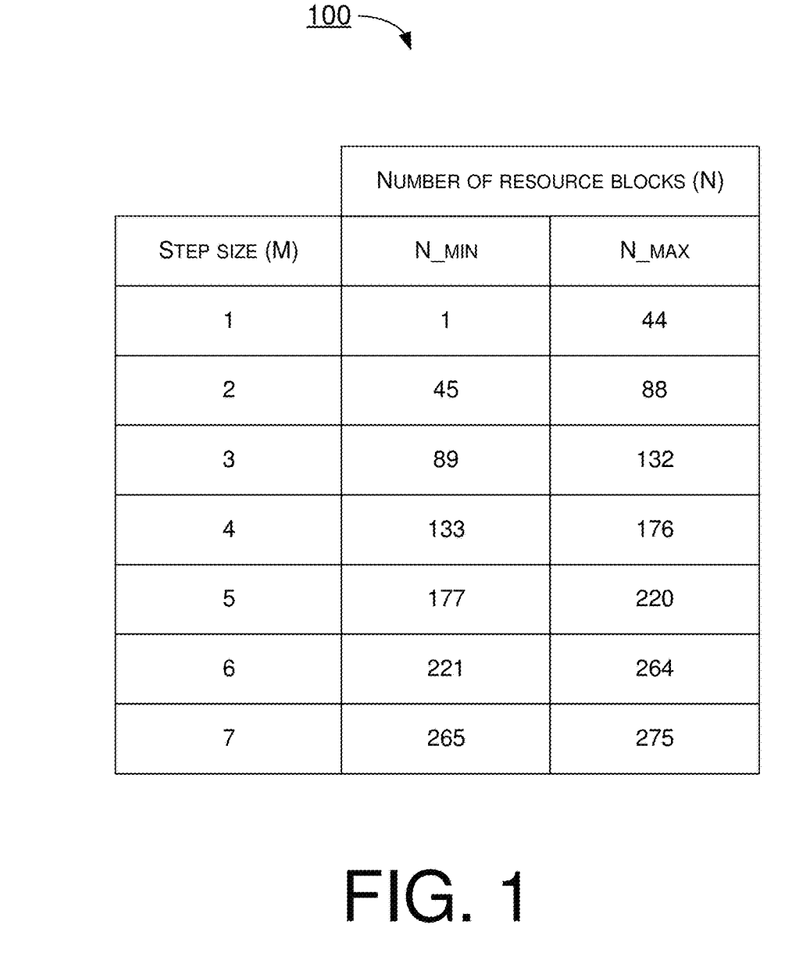
FIG. 1 is a diagram depicting an example lookup table under schemes in accordance with implementations of the present disclosure.

Alternatively, the fixed the number of FD-RA bits may be applicable to each of the configurations such SCS, bandwidth part size, etc. For example, the FD-RA bits value may depend on the number of RBs (e.g., N). In another example, the FD-RA bits value may depend on the SCS. Specifically, at least one of the first step size and the second step size may be determined/chosen based on a lookup table that gives a step size for each bandwidth range (e.g., number of RBs). FIG. 1 illustrates an example lookup table 100 under schemes in accordance with implementations of the present disclosure. Lookup table 100 illustrates an example for FD-RA field size of 10 bits and $M_1 = M_2 = M$. The apparatus may be configured to determine the step size (e.g., M) according to the number of RBs (e.g., N). The lookup table may be defined for each FD-RA field size or group of FD-RA field sizes.

Figure 2:
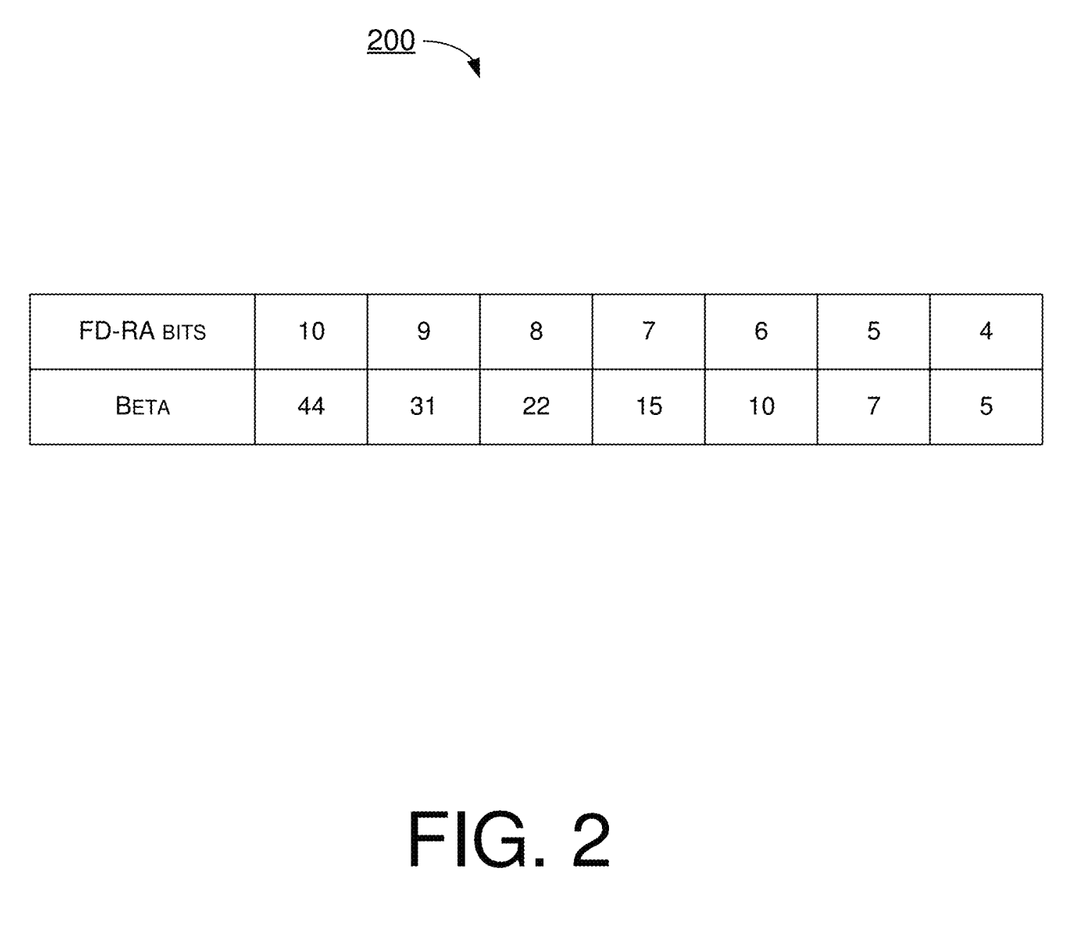
FIG. 2 is a diagram depicting an example lookup table under schemes in accordance with implementations of the present disclosure.

Alternatively, a single value (e.g., Beta) may be defined for each FD-RA field size. The number of the FD-RA bits may be configured by higher layer signalling (e.g. radio resource control (RRC) configuration). FIG. 2 illustrates an example lookup table 200 under schemes in accordance with implementations of the present disclosure. Lookup table 200 illustrates some beta values for different FD-RA field sizes. The apparatus may be configured to determine the beta value according to the number of FD-RA bits. The apparatus may further be configured to determine at least one of the first step size and the second step size according to the beta value. For example, in an event that the first step size is equal to the second step size (e.g., $M_1 = M_2 = M$), the step size (e.g., M) may be determined according to the following equation.

$(M-1) \times Beta < N \leq M \times Beta$

In some implementations, after determining the step size (e.g., $M_1$ and/or $M_2$), the fixed number of FD-RA bits may be more than sufficient to represent the RA combinations. For example, when FD-RA bits=9, $M_1=1$, and N<23, the following expression may occur.

$$FDRA_{bits} > \left\lceil \log_2\left(\sum_{n=0}^{\lfloor N/M_1 \rfloor}\left\lceil\frac{N-nM_1}{M_2}\right\rceil\right)\right\rceil$$

In such scenario, there may be extra FD-RA bits remained. The extra FD-RA bits may be determined according to the following equation.

$$Extra_{bits} = FDRA_{bits} = \left\lceil \log_2\left(\sum_{n=0}^{\lfloor N/M_1 \rfloor}\left\lceil\frac{N-nM_1}{M_2}\right\rceil\right)\right\rceil$$

The apparatus may be configured to ignore the extra bits. Alternatively, the apparatus may be configured to use the extra bits for other DCI fields.

Figure 3:
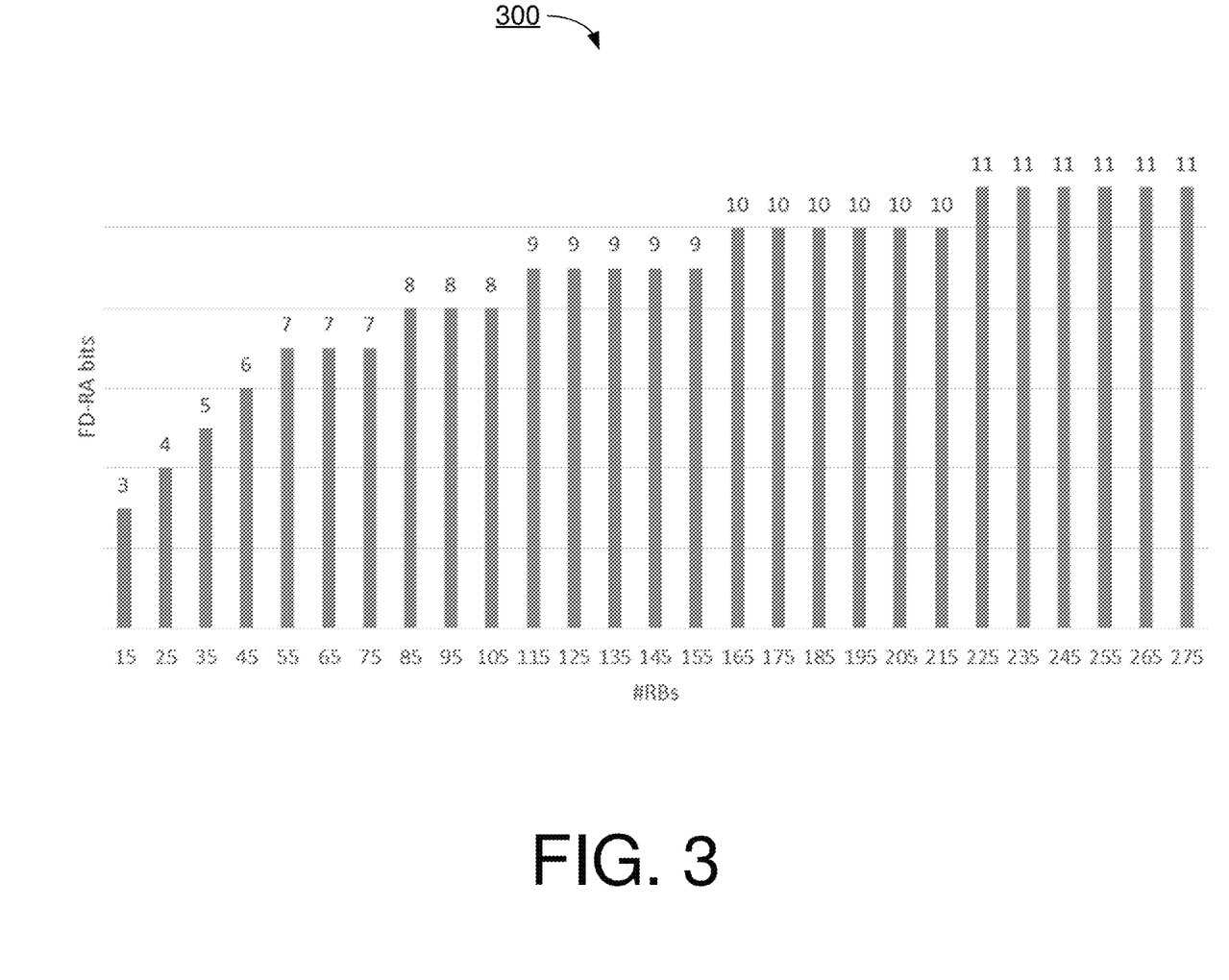
FIG. 3 is a diagram depicting an example scenario under schemes in accordance with implementations of the present disclosure.

In addition, the apparatus may also be able to determine a number of FD-RA bits according to at least one of a fixed first step size and a fixed second step size. In other words, for a given number of at least one of the fixed first step size and the fixed second step size, the number of FD-RA bits may be determined/chosen based on the number of available RBs. FIG. 3 illustrates an example scenario 300 under schemes in accordance with implementations of the present disclosure. Scenario 300 illustrates an example of the FD-RA field sizes for different number of RBs (e.g., channel bandwidth, BWP, etc.) when the step size (e.g., $M_1=M_2=M$) is fixed to 5 RBs. The fixed first step size and/or the fixed second step size may be applicable to all the configurations such as SCS, bandwidth part size, etc. For example, for a given fixed first step size $M_1$, a given fixed second step size $M_2$, and a given number of RBs, the number of FD-RA bits may be determined according to the following equation.

$$FDRA_{bits} = \left\lceil \log_2\left(\sum_{n=0}^{\lfloor N/M_1 \rfloor}\left\lceil\frac{N-nM_1}{M_2}\right\rceil\right)\right\rceil$$

N may denote the number available of RBs which may be, for example and without limitation, based on the BWP or the total/system bandwidth.

In an event that the fixed first step size is equal to the fixed second step size (e.g., $M_1=M_2=M$), the number of FD-RA bits may be determined according to the following equation.

$$FDRA_{bits} = \left\lceil \log_2\left(\frac{1}{2}\left\lceil\frac{N}{M}\right\rceil\left(\frac{N}{M}+1\right)\right)\right\rceil$$

Figure 4:
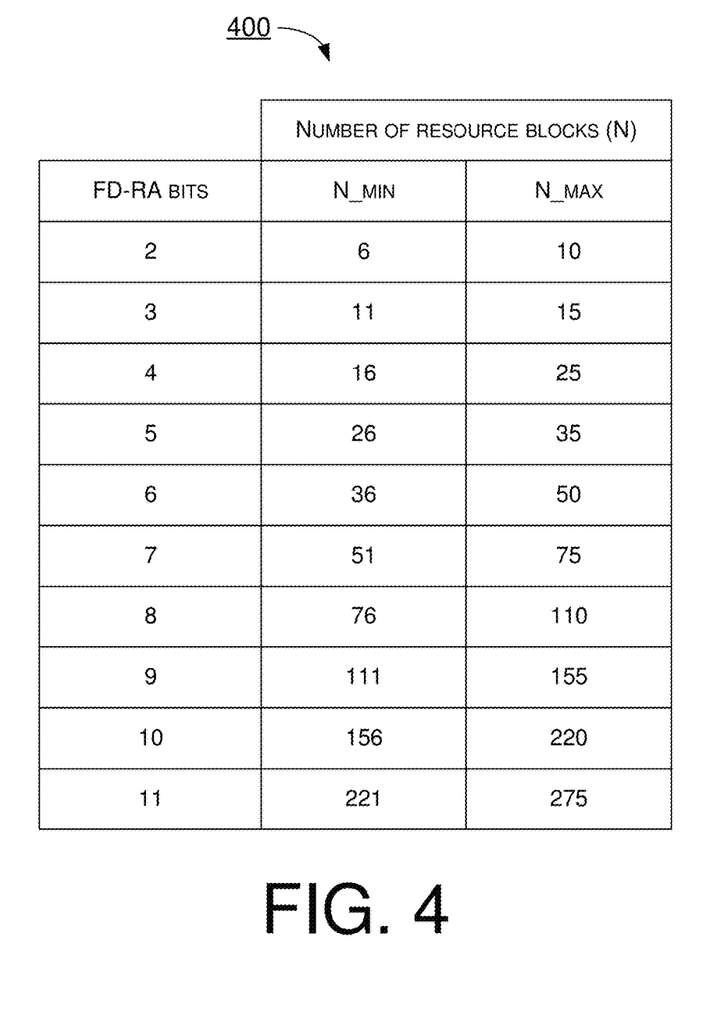
FIG. 4 is a diagram depicting an example lookup table under schemes in accordance with implementations of the present disclosure.

Alternatively, the fixed first step size and/or the fixed second step size may be applicable to each of the configurations such SCS, bandwidth part size, etc. For example, the fixed first step size and/or the fixed second step size may depend on the number of RBs (e.g., N). In another example, the fixed first step size and/or the fixed second step size may depend on the SCS. Specifically, the number of FD-RA bits may be determined/chosen based on a lookup table that gives a number of FD-RA bits for each bandwidth range (e.g., number of RBs). FIG. 4 illustrates an example lookup table 400 under schemes in accordance with implementations of the present disclosure. Lookup table 400 illustrates an example for FD-RA field sizes when the step size (e.g., $M_1=M_2=M$) is equal to 5 RBs. The apparatus may be configured to determine the number of FD-RA bits according to the number of RBs (e.g., N). The lookup table may be defined for each step size or group of step sizes.

Alternatively, the fixed first step size and/or the fixed second step size may be configured by higher layer signalling (e.g. RRC configuration). The apparatus may be configured to determine the fixed first step size and/or the fixed second step size according to higher layer signalling. The apparatus may further be configured to determine the number of FD-RA bits according to the signaled first step size and/or the signaled second step size.

In some implementations, for a fixed number of FD-RA bits (e.g., B), the first step size and/or the second step size may be optimized for efficient use of resources. For a given B, one way for formulating the optimization may be defined as $$\min_{M_1, M_2} (f(M_1, M_2)).$$

For example, one form of f($M_1$, $M_2$) may be defined as f($M_1$,$M_2$)=$M_1$+$M_2$. In other words, at least one of the first step size and the second step size may be determined by minimizing a sum of the first step size and the second step size. As the number of RBs is a function of BWP and due to flexible BWP operation, the total number of RBs for UE operation may vary widely. This implies that for a given FD-RA bits, the first step size and/or the second step size have to be determined for every BWP allocation. Accordingly, the first step size and/or the second step size may be determined according to a lookup table or determined by instantaneous computation.

Figure 7:
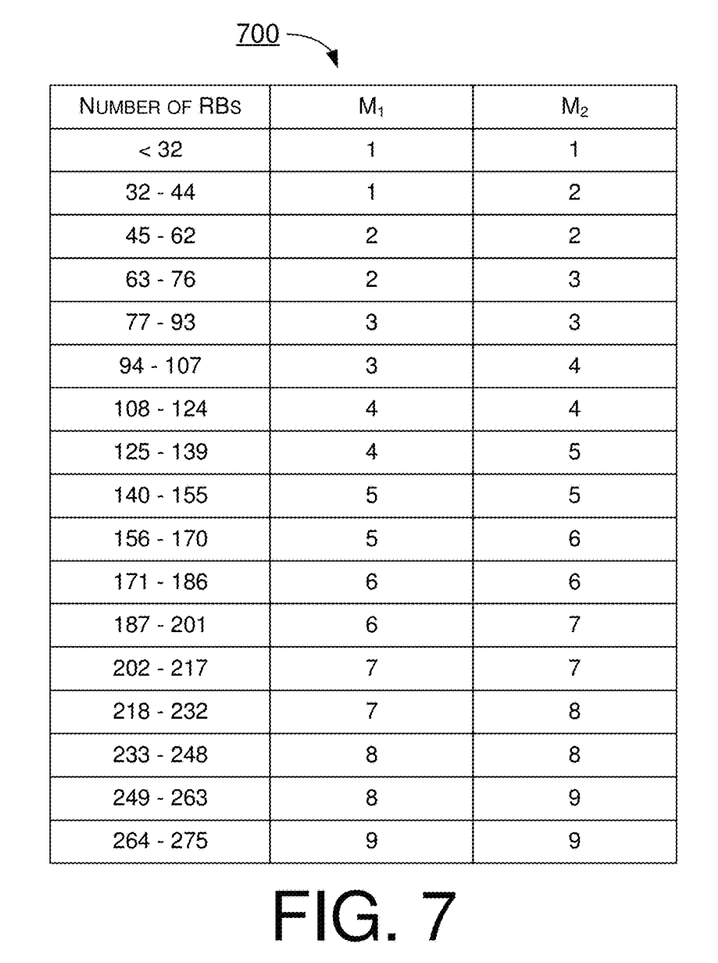
FIG. 7 is a diagram depicting an example lookup table under schemes in accordance with implementations of the present disclosure.

Specifically, for a given number of FD-RA bits and BWP, the first step size and/or the second step size may be pre-configured and stored in the network node and the UE. For all the combinations of the number of FD-RA bits and BWP, the first step size and/or the second step size may be predetermined and stored. Both the network node and the UE may store such information. For a given FD-RA bits (e.g., B), the optimal/desired values for the first step size and the second step size may be determined according to the lookup table. FIG. 7 illustrates an example lookup table 700 under schemes in accordance with implementations of the present disclosure. Lookup table 700 illustrates the values of $M_1$ and $M_2$ for a given FD-RA bits=9. A number of $M_1$ and $M_2$ values may satisfy the solution. The optimization may be determined/chosen by minimize ($M_1$+$M_2$). The interchanged $M_1$ and $M_2$ may give another set of solutions. The values of $M_1$ and $M_2$ may be interchanged as the minimization is over ($M_1$+$M_2$). Similar lookup tables may be determined for different FD-RA bits and may be stored at the network apparatus and the UE for determining $M_1$ and $M_2$ with a given number of RBs.

Figure 5:
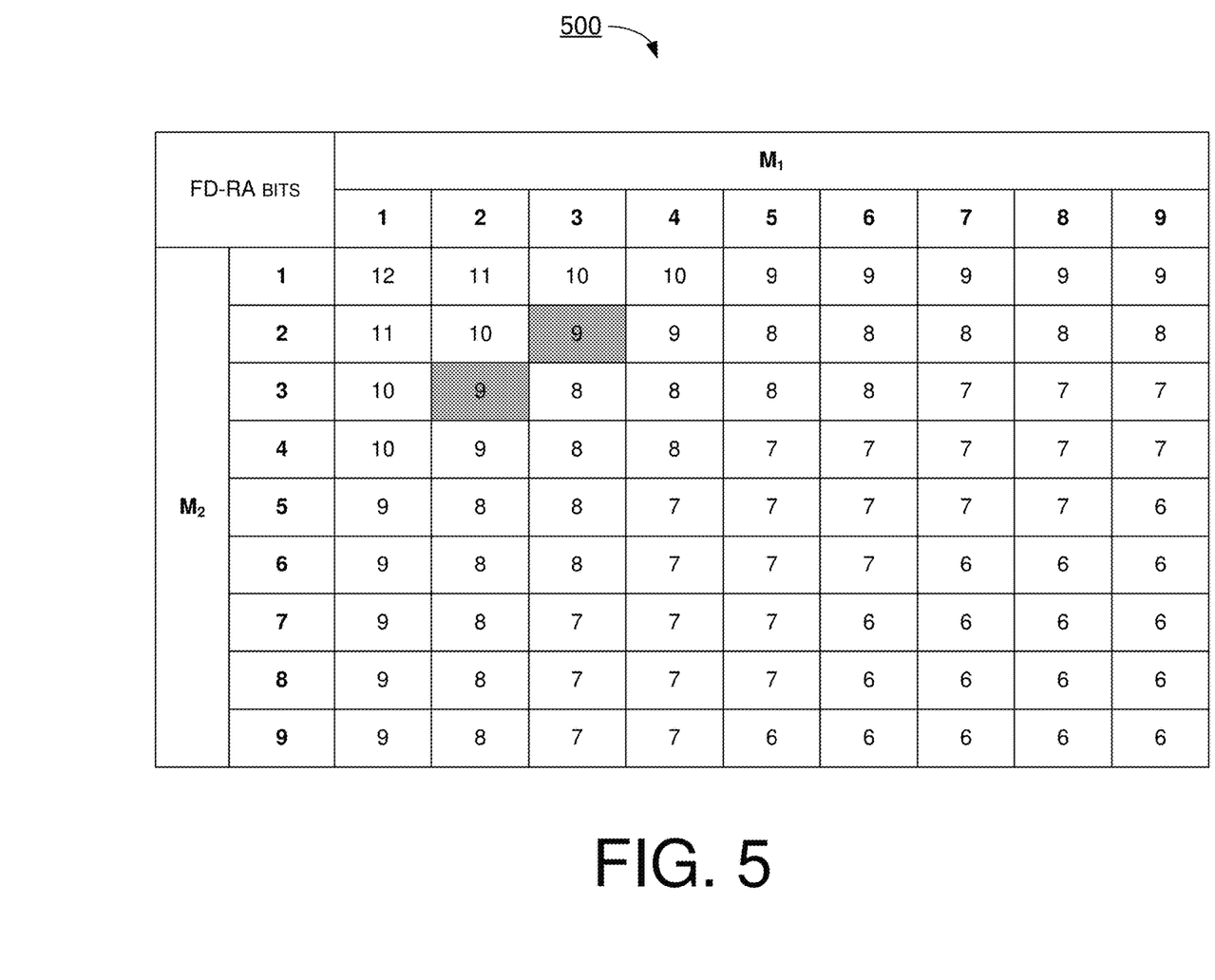
FIG. 5 is a diagram depicting an example scenario under schemes in accordance with implementations of the present disclosure.

In most of the cases, assuming that the first step size is equal to the second step size (e.g., $M_1$=$M_2$=M) may be a simple way to solve and determine the optimal value of M. However, assuming that $M_1$=$M_2$ may have some issues. For example, the $M_1$=$M_2$ solution may not exist. FIG. 5 illustrates an example scenario 500 under schemes in accordance with implementations of the present disclosure. Scenario 500 illustrates the $M_1$ and $M_2$ combinations when BWP=N=66 RBs and B=9. The entries in scenario 500 represent the number of bits required to represent the FD-RA for the choice of $M_1$ and $M_2$ given the number of RBs. As shown in FIG. 5, there are multiple solutions for $M_1$ and $M_2$ combinations when fixing the FD-RA bits to 9. Only the cells highlighted in gray represent the minimum value of ($M_1$+$M_2$) for given FD-RA bits of 9 (e.g., $M_1$=2, $M_{2=3}$ or $M_1$=3, $M_{2=2}$).

Figure 6:
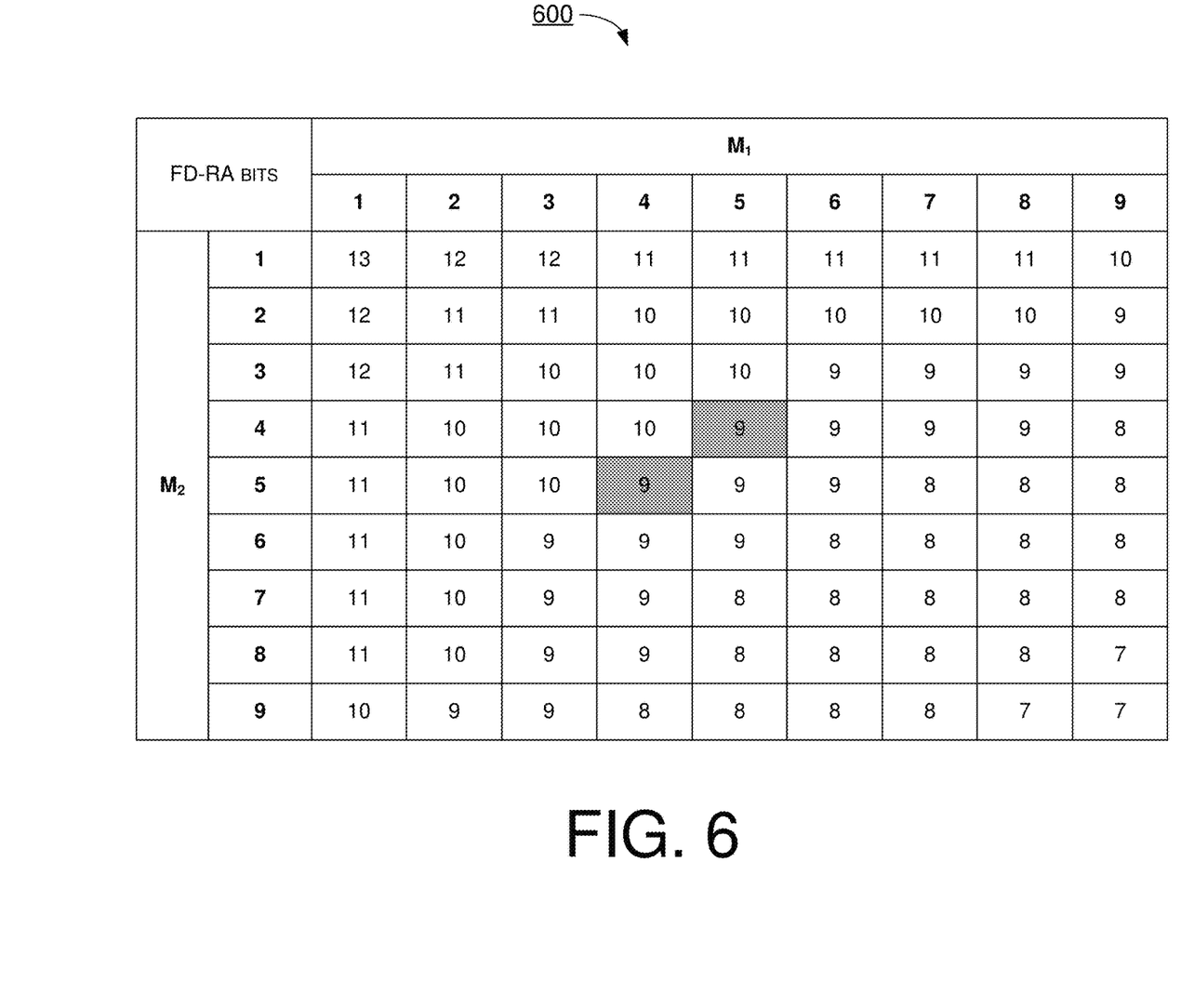
FIG. 6 is a diagram depicting an example scenario under schemes in accordance with implementations of the present disclosure.

In another example, the $M_1$=$M_2$ solution may exist but may not be the optimal solution. FIG. 6 illustrates an example scenario 600 under schemes in accordance with implementations of the present disclosure. Scenario 600 illustrates the $M_1$ and $M_2$ combinations when BWP=N=125 RBs and B=9. The entries in scenario 600 represent the number of bits required to represent the FD-RA for the choice of $M_1$ and $M_2$ given the number of RBs. As shown in FIG. 6, the solution with $M_1$=$M_2$ (e.g., $M_1$=$M_2$=5) is not the optimal solution. Only the cells highlighted in gray represent the minimum value of ($M_1$+$M_2$) for given FD-RA bits of 9 (e.g., $M_1$=4, $M_2$=5 or $M_1$=5, $M_2$=4).

In some implementations, both the network node and the UE may compute $M_1$ and $M_2$ from BWP and the FD-RA bits (e.g., B). However, there may be ambiguity for certain choices of B and BWP. For example, ambiguity may occur when more than one combination of $M_1$ and $M_2$ satisfies the FD-RA $$\min_{M_1, M_2} (f(M_1, M_2)).$$

bits and the criteria of given B, Accordingly, some pre-defined ambiguity resolving rules may be configured. The apparatus may be configured to determine at least one of the first step size and the second step size according to a predetermined rule. For example and without limitation, in an event that more than one combination of $M_1$ and $M_2$ satisfy the criterion, the apparatus may be configured to select the solution such that $M_1$>$M_2$.

Illustrative Implementations

Figure 8:
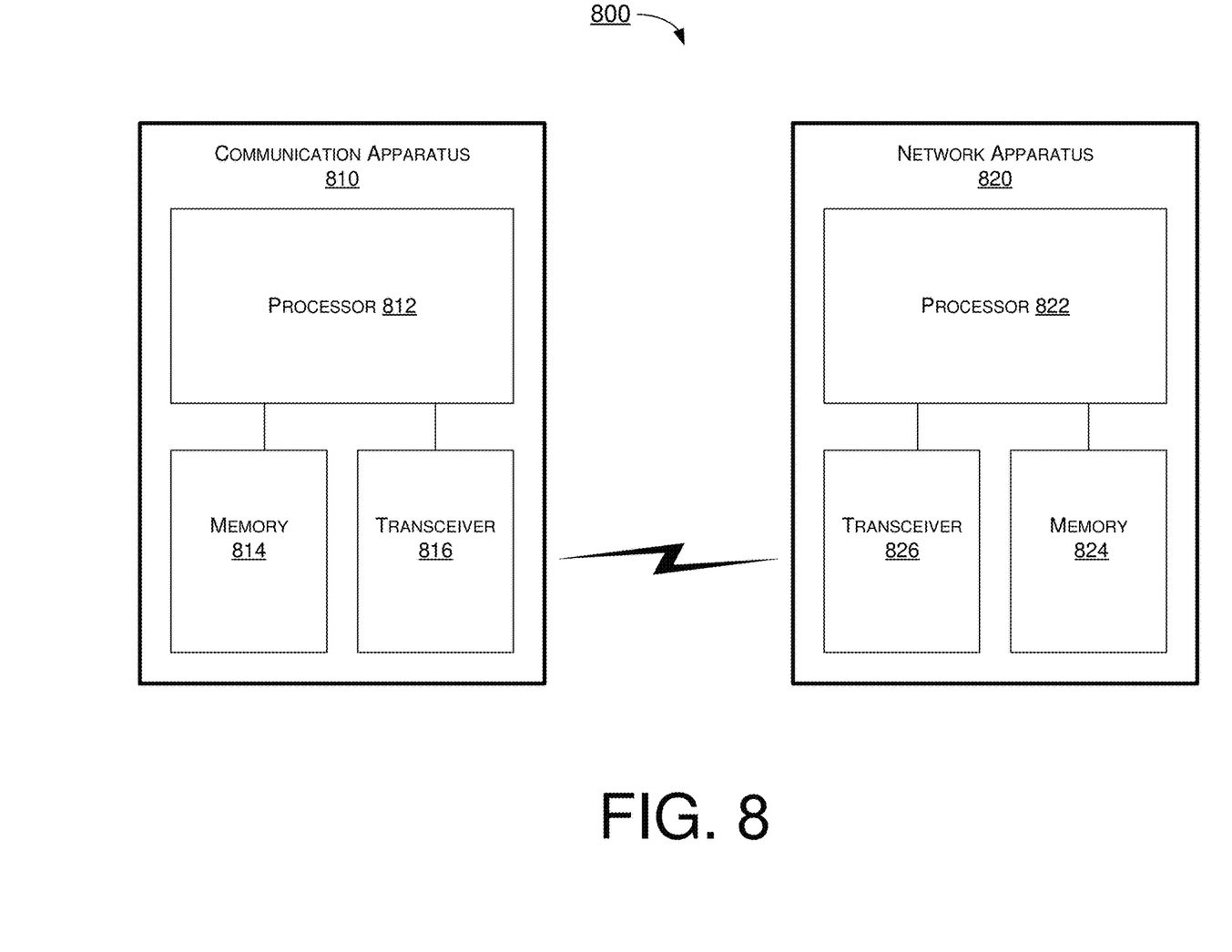
FIG. 8 is a block diagram of an example communication apparatus and an example network apparatus in accordance with an implementation of the present disclosure.
Figure 9:
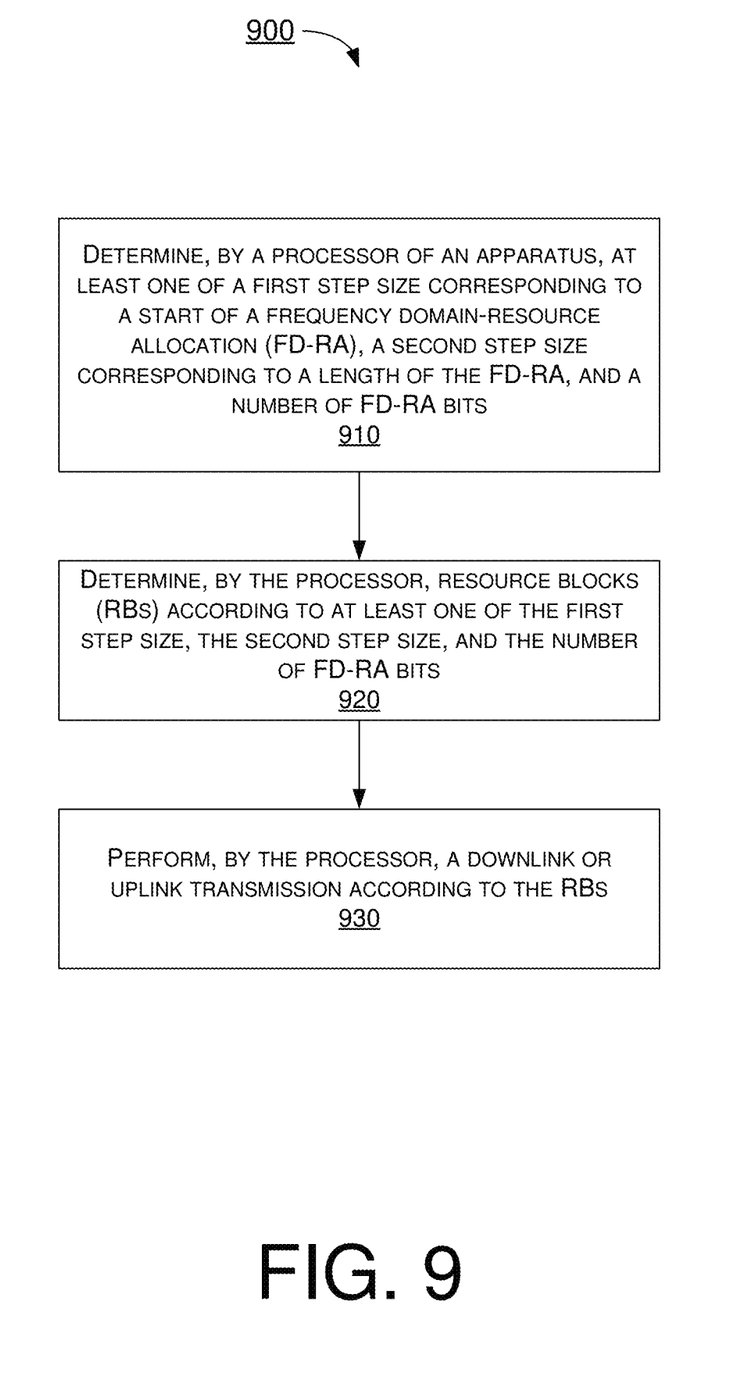
FIG. 9 is a flowchart of an example process in accordance with an implementation of the present disclosure.

FIG. 8 illustrates an example communication apparatus 810 and an example network apparatus 820 in accordance with an implementation of the present disclosure. Each of communication apparatus 810 and network apparatus 820 may perform various functions to implement schemes, techniques, processes and methods described herein pertaining to FD-RA for compact DCI design and operations with respect to user equipment and network apparatus in wireless communications, including scenarios described above as well as process 900 described below.

Communication apparatus 810 may be a part of an electronic apparatus, which may be a UE such as a portable or mobile apparatus, a wearable apparatus, a wireless communication apparatus or a computing apparatus. For instance, communication apparatus 810 may be implemented in a smartphone, a smartwatch, a personal digital assistant, a digital camera, or a computing equipment such as a tablet computer, a laptop computer or a notebook computer. Communication apparatus 810 may also be a part of a machine type apparatus, which may be an IoT or NB-IoT apparatus such as an immobile or a stationary apparatus, a home apparatus, a wire communication apparatus or a computing apparatus. For instance, communication apparatus 810 may be implemented in a smart thermostat, a smart fridge, a smart door lock, a wireless speaker or a home control center. Alternatively, communication apparatus 810 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. Communication apparatus 810 may include at least some of those components shown in FIG. 8 such as a processor 812, for example. Communication apparatus 810 may further include one or more other components not pertinent to the proposed scheme of the present disclosure (e.g., internal power supply, display device and/or user interface device), and, thus, such component(s) of communication apparatus 810 are neither shown in FIG. 8 nor described below in the interest of simplicity and brevity.

Network apparatus 820 may be a part of an electronic apparatus, which may be a network node such as a base station, a small cell, a router or a gateway. For instance, network apparatus 820 may be implemented in an eNodeB in an LTE, LTE-Advanced or LTE-Advanced Pro network or in a gNB in a 5G, NR, IoT or NB-IoT network. Alternatively, network apparatus 820 may be implemented in the form of one or more IC chips such as, for example and without limitation, one or more single-core processors, one or more multi-core processors, or one or more RISC or CISC processors. Network apparatus 820 may include at least some of those components shown in FIG. 8 such as a processor 822, for example. Network apparatus 820 may further include one or more other components not pertinent to the proposed scheme of the present disclosure (e.g., internal power supply, display device and/or user interface device), and, thus, such component(s) of network apparatus 820 are neither shown in FIG. 8 nor described below in the interest of simplicity and brevity.

In one aspect, each of processor 812 and processor 822 may be implemented in the form of one or more single-core processors, one or more multi-core processors, or one or more RISC or CISC processors. That is, even though a singular term "a processor" is used herein to refer to processor 812 and processor 822, each of processor 812 and processor 822 may include multiple processors in some implementations and a single processor in other implementations in accordance with the present disclosure. In another aspect, each of processor 812 and processor 822 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 812 and processor 822 is a special-purpose machine specifically designed, arranged and configured to perform specific tasks including power consumption reduction in a device (e.g., as represented by communication apparatus 810) and a network (e.g., as represented by network apparatus 820) in accordance with various implementations of the present disclosure.

In some implementations, communication apparatus 810 may also include a transceiver 816 coupled to processor 812 and capable of wirelessly transmitting and receiving data. In some implementations, communication apparatus 810 may further include a memory 814 coupled to processor 812 and capable of being accessed by processor 812 and storing data therein. In some implementations, network apparatus 820 may also include a transceiver 826 coupled to processor 822 and capable of wirelessly transmitting and receiving data. In some implementations, network apparatus 820 may further include a memory 824 coupled to processor 822 and capable of being accessed by processor 622 and storing data therein. Accordingly, communication apparatus 810 and network apparatus 820 may wirelessly communicate with each other via transceiver 816 and transceiver 826, respectively. To aid better understanding, the following description of the operations, functionalities and capabilities of each of communication apparatus 810 and network apparatus 820 is provided in the context of a mobile communication environment in which communication apparatus 810 is implemented in or as a communication apparatus or a UE and network apparatus 820 is implemented in or as a network node of a communication network.

In some implementations, processor 812 and/or 822 may be configured to determine at least one of the first step size corresponding to the start of the allocated RBs, the second step size corresponding to the length of the allocated RBs, and the number of FD-RA bits. Processor 812 and/or 822 may be configured to determine the allocated RBs according to at least one of the first step size, the second step size, and the number of FD-RA bits. Processor 812 and/or 822 may be configured to perform, via transceiver 816 and/or 826, a downlink or uplink transmission according to the allocated RBs.

In some implementations, processor 812 and/or 822 may be configured to determine at least one of the first step size and the second step size according to a fixed number of FD-RA bits. In other words, for a given number of the FD-RA bits (e.g., the size of the FD-RA field in the DCI), processor 812 and/or 822 may be configured to determine/choose at least one of the first step size and the second step size based on the number of available RBs. In addition to fixing the number of FD-RA bits, one of the step sizes (e.g., $M_1$ or $M_2$) may be fixed as well. The fixed number of FD-RA bits may be applicable to all the configurations such as subcarrier spacing (SCS), bandwidth part size, etc. For example, in an event that the first step size is equal to the second step size (e.g., $M_1=M_2=M$), processor 812 and/or 822 may be configured to determine the step size (e.g., M) according to the following equation.

$$FDRA_{bits} = \left\lceil \log_2\left(\frac{1}{2}\left\lceil\frac{N}{M}\right\rceil\left(\frac{N}{M}+1\right)\right) \right\rceil$$

N may denote the number available of RBs which may be, for example and without limitation, based on the BWP or the total/system bandwidth.

In some implementations, in an event that the first step size is not equal to the second step size (e.g., $M_1 \neq M_2$), processor 812 and/or 822 may be configured to determine the first step size and the second step size according to the following equation.

$$FDRA_{bits} = \left\lceil \log_2\left(\sum_{n=0}^{\lfloor N/M_1 \rfloor} \left\lceil \frac{N-nM_1}{M_2} \right\rceil\right) \right\rceil$$

It should be noted that such equation may lead to multiple solutions for $M_1$ and $M_2$. Processor 812 and/or 822 may apply further constraints to $M_1$ and $M_2$ to achieve unique $M_1$ and $M_2$ (e.g., $M_1=M_2+2$).

In some implementations, the fixed the number of FD-RA bits may be applicable to each of the configurations such SCS, bandwidth part size, etc. For example, the FD-RA bits value may depend on the number of RBs (e.g., N). In another example, the FD-RA bits value may depend on the SCS. Specifically, processor 812 and/or 822 may be configured to determine/choose at least one of the first step size and the second step size based on a lookup table that gives a step size for each bandwidth range (e.g., number of RBs). Processor 812 and/or 822 apparatus may be configured to determine the step size (e.g., M) according to the number of RBs (e.g., N). The lookup table may be defined for each FD-RA field size or group of FD-RA field sizes.

In some implementations, a single value (e.g., Beta) may be defined for each FD-RA field size. Processor 822 may configure the number of the FD-RA bits by higher layer signalling (e.g. RRC configuration). Processor 812 and/or 822 may be configured to determine the beta value according to the number of FD-RA bits. Processor 812 and/or 822 may further be configured to determine at least one of the first step size and the second step size according to the beta value. For example, in an event that the first step size is equal to the second step size (e.g., $M_1=M_2=M$), processor 812 and/or 822 may determine the step size (e.g., M) according to the following equation.

$$(M-1) \times \text{Beta} < N \leq M \times \text{Beta}$$

In some implementations, after determining the step size (e.g., $M_1$ and/or $M_2$), the fixed number of FD-RA bits may be more than sufficient to represent the RA combinations. For example, when FD-RA bits=9, $M_1=1$, and N<23, the following expression may occur.

$$FDRA_{bits} > \left\lceil \log_2 \left( \sum_{n=0}^{\lfloor N/M_1 \rfloor} \left\lceil \frac{N-nM_1}{M_2} \right\rceil \right) \right\rceil$$

In such scenario, there may be extra FD-RA bits remained. Processor 812 and/or 822 may determine the extra FD-RA bits according to the following equation.

$$Extra_{bits} = FDRA_{bits} - \left\lceil \log_2 \left( \sum_{n=0}^{\lfloor N/M_1 \rfloor} \left\lceil \frac{N-nM_1}{M_2} \right\rceil \right) \right\rceil$$

Processor 812 and/or 822 may be configured to ignore the extra bits. Alternatively, processor 812 and/or 822 may be configured to use the extra bits for other DCI fields.

In some implementations, processor 812 and/or 822 may also be able to determine a number of FD-RA bits according to at least one of a fixed first step size and a fixed second step size. In other words, for a given number of at least one of the fixed first step size and the fixed second step size, processor 812 and/or 822 may determine/choose the number of FD-RA bits based on the number of available RBs. The fixed first step size and/or the fixed second step size may be applicable to all the configurations such as SCS, bandwidth part size, etc. For example, for a given fixed first step size $M_1$, a given fixed second step size $M_2$, and a given number of RBs, processor 812 and/or 822 may determine the number of FD-RA bits according to the following equation.

$$FDRA_{bits} > \left\lceil \log_2 \left( \sum_{n=0}^{\lfloor N/M_1 \rfloor} \left\lceil \frac{N-nM_1}{M_2} \right\rceil \right) \right\rceil$$

N may denote the number available of RBs which may be, for example and without limitation, based on the BWP or the total/system bandwidth.

In some implementations, in an event that the fixed first step size is equal to the fixed second step size (e.g., $M_1=M_2=M$), processor 812 and/or 822 may determine the number of FD-RA bits according to the following equation.

$$FDRA_{bits} = \left\lceil \log_2 \left( \frac{1}{2} \left\lceil \frac{N}{M} \right\rceil \left( \frac{N}{M} + 1 \right) \right) \right\rceil$$

In some implementations, the fixed first step size and/or the fixed second step size may be applicable to each of the configurations such SCS, bandwidth part size, etc. For example, the fixed first step size and/or the fixed second step size may depend on the number of RBs (e.g., N). In another example, the fixed first step size and/or the fixed second step size may depend on the SCS. Specifically, processor 812 and/or 822 may determine/choose the number of FD-RA bits based on a lookup table that gives a number of FD-RA bits for each bandwidth range (e.g., number of RBs). Processor 812 and/or 822 may determine may be configured to determine the number of FD-RA bits according to the number of RBs (e.g., N). The lookup table may be defined for each step size or group of step sizes.

In some implementations, processor 822 may configure the fixed first step size and/or the fixed second step size by higher layer signalling (e.g. RRC configuration). Processor 812 may be configured to determine the fixed first step size and/or the fixed second step size according to higher layer signalling. Processor 812 may further be configured to determine the number of FD-RA bits according to the signaled first step size and/or the signaled second step size.

In some implementations, for a fixed number of FD-RA bits (e.g., B), processor 812 and/or 822 may optimize the first step size and/or the second step size for efficient use of resources. For a given B, one way for formulating the optimization may be defined as $$\min_{M_1, M_2} (f(M_1, M_2)).$$

For example, one form of $f(M_1,M_2)$ may be defined as $f(M_1,M_2)=M_1+M_2$. In other words, processor 812 and/or 822 may determine at least one of the first step size and the second step size by minimizing a sum of the first step size and the second step size. As the number of RBs is a function of BWP and due to flexible BWP operation, the total number of RBs for UE operation may vary widely. This implies that for a given FD-RA bits, the first step size and/or the second step size have to be determined for every BWP allocation. Accordingly, processor 812 and/or 822 may determine the first step size and/or the second step size according to a lookup table or determined by instantaneous computation.

In some implementations, for a given number of FD-RA bits and BWP, the first step size and/or the second step size may be pre-configured and stored in the memory 814 and/or 824. For all the combinations of the number of FD-RA bits and BWP, the first step size and/or the second step size may be predetermined and stored in the memory 814 and/or 824. For a given FD-RA bits (e.g., B), processor 812 and/or 822 may determine the optimal/desired values for the first step size and the second step size according to the lookup table. A number of $M_1$ and $M_2$ values may satisfy the solution. Processor 812 and/or 822 may determine/choose the optimization by minimize $(M_1+M_2)$. The interchanged $M_1$ and $M_2$ may give another set of solutions. The values of $M_1$ and $M_2$ may be interchanged as the minimization is over $(M_1+M_2)$. Similar lookup tables may be determined for different FD-RA bits and may be stored at the memory 814 and/or 824 for determining $M_1$ and $M_2$ with a given number of RBs.

In some implementations, processor 812 and/or 822 may compute $M_1$ and $M_2$ from BWP and the FD-RA bits (e.g., B). However, there may be ambiguity for certain choices of B and BWP. For example, ambiguity may occur when more than one combination of $M_1$ and $M_2$ satisfies the FD-RA bits and the criteria of given B $$\min_{M_1, M_2} (f(M_1, M_2)).$$

Accordingly, some predefined ambiguity resolving rules may be configured. Processor 812 and/or 822 may be configured to determine at least one of the first step size and the second step size according to a predetermined rule. For example and without limitation, in an event that more than one combination of $M_1$ and $M_2$ satisfy the criterion, processor 812 and/or 822 may be configured to select the solution such that $M_1 > M_2$.

Illustrative Processes

FIG. 9 illustrates an example process 900 in accordance with an implementation of the present disclosure. Process 900 may be an example implementation of above scenarios, whether partially or completely, with respect to FD-RA for compact DCI design and operations with the present disclosure. Process 900 may represent an aspect of implementation of features of communication apparatus 810 and/or network apparatus 820. Process 900 may include one or more operations, actions, or functions as illustrated by one or more of blocks 910, 920 and 930. Although illustrated as discrete blocks, various blocks of process 900 may be divided into additional blocks, combined into fewer blocks, or eliminated, depending on the desired implementation. Moreover, the blocks of process 900 may executed in the order shown in FIG. 9 or, alternatively, in a different order. Process 900 may be implemented by communication apparatus 810 and/or network apparatus 820 or any suitable UE, network node or machine type devices. Solely for illustrative purposes and without limitation, process 900 is described below in the context of communication apparatus 810. Process 900 may begin at block 910.

At 910, process 900 may involve processor 812 of apparatus 810 determining at least one of a first step size corresponding to a start of an FD-RA, a second step size corresponding to a length of the FD-RA, and a number of FD-RA bits. Process 900 may proceed from 910 to 920.

At 920, process 900 may involve processor 812 determining RBs according to at least one of the first step size, the second step size, and the number of FD-RA bits. Process 900 may proceed from 920 to 930.

At 930, process 900 may involve processor 812 performing a downlink or uplink transmission according to the RBs.

In some implementations, process 900 may involve processor 812 determining at least one of the first step size and the second step size according to a fixed number of FD-RA bits.

In some implementations, process 900 may involve processor 812 determining at least one of the first step size and the second step size according to a number of RBs.

In some implementations, process 900 may involve processor 812 determining at least one of the first step size and the second step size according to a lookup table.

In some implementations, process 900 may involve processor 812 determining a beta value according to the number of FD-RA bits. Process 900 may further involve processor 812 determining at least one of the first step size and the second step size according to the beta value.

In some implementations, process 900 may involve processor 812 determining the number of FD-RA bits according to at least one of a fixed first step size and a fixed second step size.

In some implementations, process 900 may involve processor 812 determining the number of FD-RA bits according to a number of RBs.

In some implementations, process 900 may involve processor 812 determining the number of FD-RA bits according to a lookup table.

In some implementations, process 900 may involve processor 812 determining at least one of the first step size and the second step size by minimizing a sum of the first step size and the second step size.

In some implementations, process 900 may involve processor 812 determining at least one of the first step size and the second step size according to a predetermined rule.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    determining, by a processor of an apparatus, at least one of a first step size corresponding to a start of a frequency domain-resource allocation (FD-RA), a second step size corresponding to a length of the FD-RA, and a number of FD-RA bits;
    determining, by the processor, resources blocks (RBs) according to at least one of the first step size, the second step size, and the number of FD-RA bits; and
    performing, by the processor, a downlink or uplink transmission according to the RBs,
    wherein, in an event that the first step size and the second step size are configured by a radio resource control (RRC) configuration as a fixed step size, the determining of at least one of the first step size, the second step size, and the number of the FD-RA bits comprises determining the number of the FD-RA bits in the resource allocation field of the compact DCI based on a number of available RBs and the fixed step size, and
    wherein the first step size and the second step size are equal and configured with a single RRC parameter.

2. The method of claim 1, further comprising:
    determining, by the processor, at least one of the first step size and the second step size according to a fixed number of FD-RA bits.

3. The method of claim 1, further comprising:
    determining, by the processor, at least one of the first step size and the second step size according to a number of RBs.

4. The method of claim 1, further comprising:
    determining, by the processor, at least one of the first step size and the second step size according to a lookup table.

5. The method of claim 1, further comprising:
    determining, by the processor, a beta value according to the number of FD-RA bits; and
    determining, by the processor, at least one of the first step size and the second step size according to the beta value.

6. The method of claim 1, further comprising:
    determining, by the processor, at least one of the first step size and the second step size by minimizing a sum of the first step size and the second step size.

7. The method of claim 1, further comprising:
    determining, by the processor, at least one of the first step size and the second step size according to a predetermined rule.

8. An apparatus, comprising:
    a transceiver capable of wirelessly communicating with a peer apparatus of a wireless network; and
    a processor communicatively coupled to the transceiver, the processor capable of:
        determining at least one of a first step size corresponding to a start of a frequency domain-resource allocation (FD-RA), a second step size corresponding to a length of the FD-RA, and a number of FD-RA bits in a resourde allocation field of a compact downlink control information (DCI);
        determining resources blocks (RBs) according to at least one of the first step size, the second step size, and the number of FD-RA bits; and
        performing a downlink or uplink transmission with the peer apparatus according to the RBs;
    wherein, in an event that the first step size and the second step size are configured by a radio resource control (RRC) configuration as a fixed step size, in determining at least one of the first step size, the second step size, and the number of the FD-RA bits, the processor is configured to determine the number of the FD-RA bits in the resource allocation field of the compact DCI based on a number of available RBs and the fixed step size,
    wherein the first step size and the second step size are equal and configured with a single RRC parameter.

9. The apparatus of claim 8, wherein the processor is further capable of:
    determining at least one of the first step size and the second step size according to a fixed number of FD-RA bits.

10. The apparatus of claim 8, wherein the processor is further capable of:
    determining at least one of the first step size and the second step size according to a number of RBs.

11. The apparatus of claim 8, wherein the processor is further capable of:
    determining at least one of the first step size and the second step size according to a lookup table.

12. The apparatus of claim 8, wherein the processor is further capable of:

determining a beta value according to the number of FD-RA bits; and determining at least one of the first step size and the second step size according to the beta value.

13. The apparatus of claim 8, wherein the processor is further capable of:

determining at least one of the first step size and the second step size by minimizing a sum of the first step size and the second step size.

14. The apparatus of claim 8, wherein the processor is further capable of:

determining at least one of the first step size and the second step size according to a predetermined rule.

* * * * *